US011279331B2

(12) United States Patent
Terasaka et al.

(10) Patent No.: US 11,279,331 B2
(45) Date of Patent: Mar. 22, 2022

(54) BRAKING CONTROL DEVICE OF VEHICLE (71) Applicant: ADVICS CO., LTD., Kariya (JP)

(72) Inventors: Masato Terasaka, Kariya (JP); Chisa Kitahara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 152 days.

(21) Appl. No.: 16/759,156

(22) PCT Filed: Nov. 29, 2018

(86) PCT No.: PCT/JP2018/044099
§ 371 (c)(1),
(2) Date: Apr. 24, 2020

(87) PCT Pub. No.: WO2019/107524
PCT Pub. Date: Jun. 6, 2019

(65) Prior Publication Data
US 2021/0179042 A1 Jun. 17, 2021

(30) Foreign Application Priority Data
Nov. 29, 2017 (JP) .............................. JP2017-228626

(51) Int. Cl.
B60T 8/17 (2006.01)
B60T 8/1755 (2006.01)
(Continued)

(52) U.S. Cl.
CPC .......... B60T 8/17551 (2013.01); B60T 8/171 (2013.01); B60T 8/172 (2013.01); B60T 2201/16 (2013.01);
(Continued)

(58) Field of Classification Search
CPC ...... B60T 8/17551; B60T 8/171; B60T 8/172; B60T 2201/16; B60T 2220/00; B60T 2250/03; B60T 8/1755
See application file for complete search history.

(56) References Cited

U.S. PATENT DOCUMENTS

2011/0077834 A1  3/2011  Kudo et al.
2017/0232944 A1* 8/2017  Owen ..................... B60T 8/171
                                                        701/94
2017/0247023 A1* 8/2017  Owen ..................... B60T 8/171

FOREIGN PATENT DOCUMENTS

JP    2011073575 A    4/2011

OTHER PUBLICATIONS

International Search Report (PCT/ISA/210) dated Mar. 5, 2019, by the Japanese Patent Office as the International Searching Authority for International Application No. PCT/JP2018/044099.

* cited by examiner

Primary Examiner — Mary Cheung
(74) Attorney, Agent, or Firm — Buchanan Ingersoll & Rooney PC (57) ABSTRACT A braking control device includes an actuator, a controller, a steering angle sensor, and a yaw rate sensor. The controller calculates a reference turning amount, an actual turning amount, an understeer index, sets to a non-adjustment region in which the increase slope is not decreased when the understeer index is smaller than or equal to a first threshold value, sets to an adjustment region in which the increase slope is decreased when the understeer index is greater than or equal to a second threshold value greater than the first threshold value, and sets to a transition region in which the increase slope is decreased when the understeer index is transitioned from the non-adjustment region and the increase slope is not decreased when the understeer index is transi- (Continued)

tioned from the adjustment region when the understeer index is greater than the first threshold value and smaller than the second threshold value.

2 Claims, 5 Drawing Sheets

(51) Int. Cl.
*B60T 8/171* (2006.01)
*B60T 8/172* (2006.01)
(52) U.S. Cl.
CPC ....... *B60T 2220/00* (2013.01); *B60T 2250/03* (2013.01)

BRAKING CONTROL DEVICE OF VEHICLE

TECHNICAL FIELD

The present invention relates to a braking control device of a vehicle.

BACKGROUND ART

Patent Literature 1 discloses a device that, for the purpose of "improving with satisfactory responsiveness instability of the vehicle at the time of understeer and performing while maintaining the amplitude of a correction steering by a driver within a constant range", "includes a turning direction determination means that determines a turning direction of a vehicle, and a pressure increase/decrease control means that executes a turning understeer specifying control when a pressure increasing mode is set for a control mode, and that applies a pressure increase restriction of the pressure increase control in the antiskid control based on an absolute value of a steering angle deviation calculated by a steering angle deviation calculation means with respect to an outside turning front wheel determined on the basis of the turning direction determined by the turning direction determination means and decreases a pressure increase slope of the pressure increase control the greater the absolute value". In this device, oversteer of the vehicle is determined, and when the absolute value of the steering angle deviation is greater than the threshold value and the vehicle is not oversteered, the pressure increase slope is decreased.

In the antiskid control at the time of vehicle turning, there is a trade-off relationship between directional stability and deceleration ability of the vehicle. If the pressure increase slope (also referred to as "increase slope") of the pressure increase control is decreased, the directional stability is improved. On the other hand, if the pressure increase slope is increased, the deceleration ability of the vehicle is increased. Therefore, in the braking control device of the vehicle that executes the antiskid control (particularly, at the time of sharp turn), it is desired that the above-mentioned trade-off relationship be suitably compatible.

CITATIONS LIST

Patent Literature

Patent Literature 1: Japanese Unexamined Patent Publication No. 2011-73575

SUMMARY OF INVENTION

Technical Problems

An object of the present invention is to provide a braking control device of a vehicle that executes an antiskid control so that the directional stability and the deceleration ability of the vehicle can be suitably compatible.

Solutions to Problems

A braking control device of a vehicle according to the present invention includes an actuator (HU) that individually adjusts a braking torque (Tq) of wheels (WH) of the vehicle, and a controller (ECU) that executes an antiskid control for decreasing an increase slope (Kz) of the braking torque (Tq) of the outside turning front wheel of the vehicle through the actuator (HU) when a sharp turn of the vehicle is determined. The braking control device further includes a steering angle sensor (SA) that detects a steering angle (Sa) of the steered wheels (WHi, WHj) of the vehicle, and a yaw rate sensor (YR) that detects a yaw rate (Yr) of the vehicle.

In the braking control device of the vehicle according to the present invention, the controller (ECU) calculates a reference turning amount (Tr) based on the steering angle (Sa), calculates an actual turning amount (Ta) based on the yaw rate (Yr), and calculates an understeer index (Du) representing a magnitude of understeer of the vehicle based on the reference turning amount (Tr) and the actual turning amount (Ta). The controller (ECU) is set to a non-adjustment region (RO) in which the increase slope (Kz) is not decreased when the understeer index (Du) is smaller than or equal to a first threshold value (du) (Du≤du), set to an adjustment region (RP) in which the increase slope (Kz) is decreased when the understeer index (Du) is greater than or equal to a second threshold value (dv) greater than the first threshold value (du) (Du≥dv>du), and set to a transition region (RQ) in which the increase slope (Kz) is decreased when the understeer index (Du) is transitioned from the non-adjustment region (RO) (RO→RQ) and the increase slope (Kz) is not decreased when the understeer index (Du) is transitioned from the adjustment region (RP) (RP→RQ) when the understeer index (Du) is greater than the first threshold value (du) and smaller than the second threshold value (dv) (du<Du<dv).

According to the configuration described above, three regions RO, RP, and RQ are set according to the understeer index Du. In the transition region RQ, whether or not restriction (decrease adjustment) is necessary is determined in view of the changing direction of the understeer index Du. Specifically, in the transition of "RO→RQ", since the understeer tendency is expanding, the increase slope Kz is decreased, and vehicle stability is ensured. On the other hand, in the transition of "RP→RQ", since the understeer tendency is converging, the increase slope Kz is increased early, and the deceleration of the vehicle is ensured. Both directional stability of the vehicle and deceleration ability of the vehicle are compatible by providing the transition region RQ having the above configuration between the adjustment region RP and the non-adjustment region RO.

DESCRIPTION OF EMBODIMENT

Symbols of Configuring Members, Etc., Subscripts at the End of the Symbols, and Motion/moving Direction In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders is described as wheel cylinder CWi of the right front wheel, wheel cylinder CWj of the left front wheel, wheel cylinder CWk of the right rear wheel, and wheel cylinder CWl of the left rear wheel. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The subscripts "1" and "2" added to the end of various symbols are comprehensive symbols indicating which of the two braking systems they relate to. Specifically, "1" indicates the first system and "2" indicates the second system. For example, in the two master cylinder fluid passages, they are expressed as a first master cylinder fluid passage HM1 and a second master cylinder fluid passage HM2. Furthermore, the subscripts "1" and "2" at the end of the symbol can be omitted. When the subscripts "1" and "2" are omitted, each symbol represents a generic name of each of the two braking systems. For example, "HM" represents the master cylinder fluid passage of each braking system.

Figure 1:
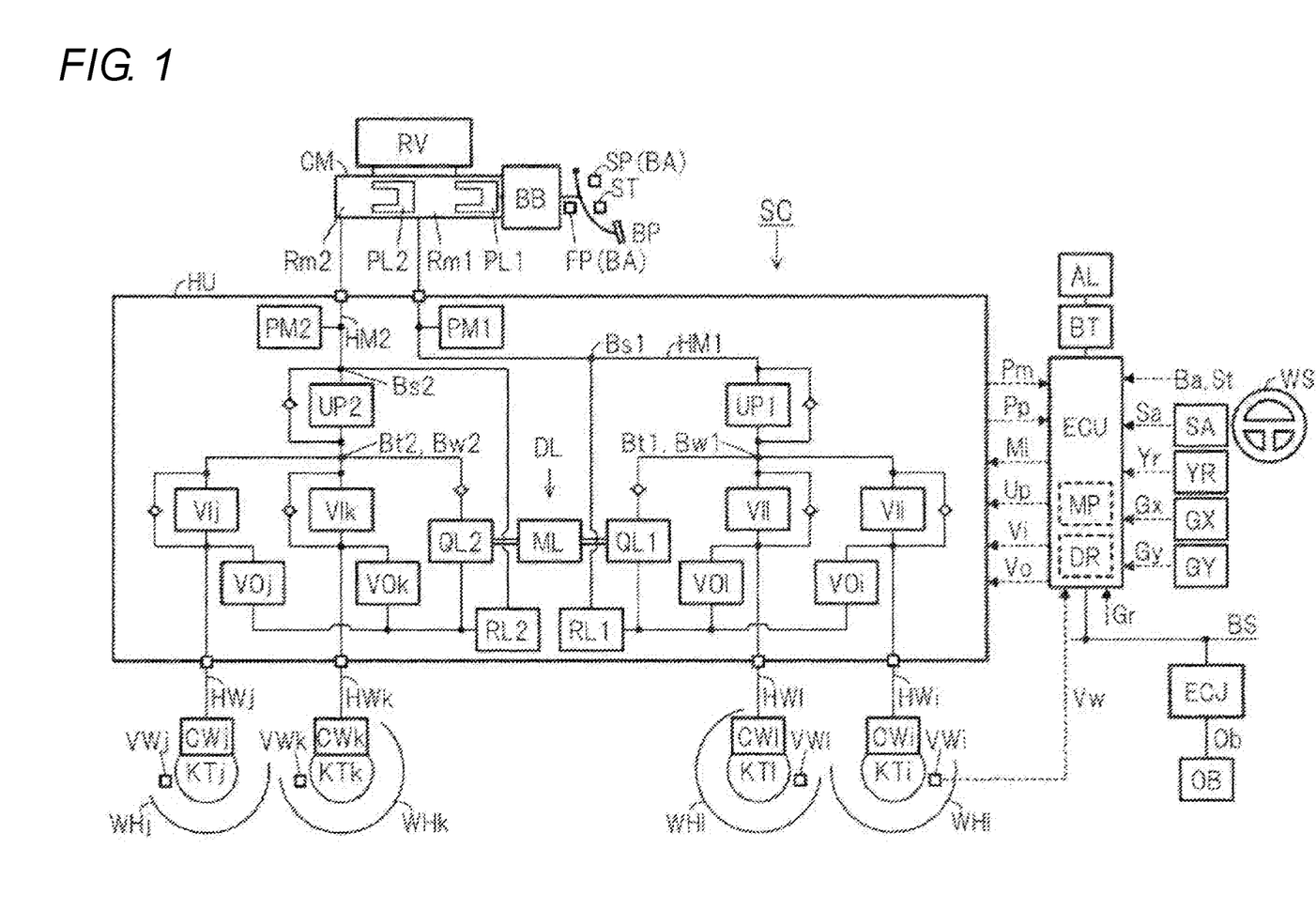
FIG. 1 is an overall configuration view describing an embodiment of a braking control device SC of a vehicle according to the present invention.

Embodiment of a Braking Control Device of a Vehicle According to the Present Invention An embodiment of a braking control device SC according to the present invention will be described with reference to an overall configuration view of FIG. 1. A master cylinder CM is connected to a wheel cylinder CW by way of a master cylinder fluid passage HM and a wheel cylinder fluid passage HW. The fluid passage is a passage for moving brake fluid BF which is the working fluid of the braking control device SC, and corresponds to a brake piping, a fluid path of a fluid unit, a hose, and the like. The inside of the fluid passage is filled with the brake fluid BF. In the fluid passage, the side closer to the reservoir RV is called "upstream", and the side closer to the wheel cylinder CW is called "downstream".

The vehicle employs two systems of fluid passages. A first system (system related to a first master cylinder chamber Rm1) of the two systems is connected to the wheel cylinders CWi and CWl. A second system (system related to a second master cylinder chamber Rm2) is connected to the wheel cylinders CWj and CWk. That is, in the first embodiment, a so-called diagonal type (also referred to as "X type") is adopted.

The vehicle equipped with the braking control device SC includes a braking operation member BP, a wheel cylinder CW, a reservoir RV, a master cylinder CM, and a brake booster BB. The braking operation member (e.g., brake pedal) BP is a member operated by the driver to decelerate the vehicle. The braking torque Tq of the wheel WH is adjusted, and the braking force is generated at the wheel WH by operating the braking operation member BP.

A rotating member (e.g., brake disc) KT is fixed to each wheel WH of the vehicle. The brake caliper is arranged so as to sandwich the rotating member KT. The wheel cylinder CW is provided in the brake caliper, and as the pressure (brake fluid pressure) Pw of the brake fluid BF in the wheel cylinder CW is increased, the friction member (e.g., brake pad) is pressed against the rotating member KT. Since the rotating member KT and the wheel WH are fixed to rotate integrally, a braking torque Tq is generated at the wheel WH by the frictional force generated at this time. The braking torque Tq causes a deceleration slip on the wheel WH, and as a result, a braking force is generated.

The reservoir (atmospheric pressure reservoir) RV is a tank for the working fluid, and the brake fluid BF is stored inside. The master cylinder CM is mechanically connected to the braking operation member BP by way of a brake rod, a clevis (U-shaped link) and the like. The master cylinder CM is a tandem type, and its interior is divided into master cylinder chambers Rm1 and Rm2 by master pistons PL1 and PL2. When the braking operation member BP is not operated, the master cylinder chambers Rm1, Rm2 of the master cylinder CM are in a communicating state with the reservoir RV. Master cylinder fluid passages HM1 and HM2 are connected to the master cylinder CM. When the braking operation member BP is operated, the master pistons PL1, PL2 move forward, and the master cylinder chambers Rm1, Rm2 are shut off from the reservoir RV. When the operation of the braking operation member BP is increased, the brake fluid BF is pressure fed from the master cylinder CM toward the wheel cylinder CW through the master cylinder fluid passages HM1, HM2.

The operation force Fp of the braking operation member BP by the driver is reduced by the brake booster (also simply referred to as "booster") BB. A negative pressure type booster BB is adopted. The negative pressure is generated by an engine or an electric negative pressure pump. As the booster BB, that which uses an electric motor as a drive source may be employed (e.g., an electric booster, an accumulator type hydraulic booster).

The vehicle includes a wheel speed sensor VW, a steering angle sensor SA, a yaw rate sensor YR, a longitudinal acceleration sensor GX, a lateral acceleration sensor GY, a braking operation amount sensor BA, an operation switch ST, and a distance sensor OB. Each wheel WH of the vehicle includes a wheel speed sensor VW to detect the wheel speed Vw. The signal of the wheel speed Vw is used for independent control of each wheel such as antiskid control for suppressing the lock tendency of the wheel WH (i.e., excessive deceleration slip).

A steering operation member (e.g., steering wheel) WS is provided with a steering angle sensor SA for detecting a steering angle Sa (steering angles of the steered wheels WHi and WHj). The body of the vehicle includes a yaw rate sensor YR to detect a yaw rate (yaw angular velocity) Yr. Furthermore, the longitudinal acceleration sensor GX and the lateral acceleration sensor GY are provided to detect the acceleration (longitudinal acceleration) Gx in the longitudinal direction (advancing direction) of the vehicle and the acceleration (lateral acceleration) Gy in the lateral direction (direction perpendicular to the advancing direction).

A braking operation amount sensor BA is provided so as to detect an operation amount Ba of the braking operation member BP (brake pedal) by the driver. As the braking operation amount sensor BA, at least one of a master cylinder fluid pressure sensor PM that detects the fluid pressure of the master cylinder CM (master cylinder fluid pressure) Pm, an operation displacement sensor SP that detects the operation displacement Sp of the braking operation member BP, and an operation force sensor FP that detects the operation force Fp of the braking operation member BP is adopted.

An operation switch ST is provided on the braking operation member BP. The operation switch ST detects whether the driver operated the braking operation member BP. When the braking operation member BP is not operated (that is, at the time of non-braking), an off signal is output as the operation signal St. On the other hand, when the braking operation member BP is operated (that is, at the time of braking), an on signal is output as the operation signal St.

The vehicle is provided with a distance sensor OB so as to detect a distance (relative distance) Ob between an object existing in front of the own vehicle (another vehicle, fixed object, person, bicycle, etc.) and the own vehicle. For example, a camera, a radar, or the like is employed as the distance sensor OB. The distance Ob is input to a controller ECJ. The controller ECJ calculates a required deceleration Gr based on the relative distance Ob.

Electronic Control Unit ECU

The braking control device SC is configured by a controller ECU and a fluid unit HU (corresponding to an "actuator").

The controller (also referred to as "electronic control unit") ECU is configured to include an electric circuit substrate on which a microprocessor MP or the like is mounted and a control algorithm programmed in the microprocessor MP. The controller ECU is network-connected to another controller (e.g., driving support controller ECJ) through an in-vehicle communication bus BS so as to share signals (detected values, calculated values, etc.). The driving support controller ECJ transmits a required deceleration Gr (target value) for executing the automatic braking control so as to avoid a collision with an object (e.g., an obstacle) in front of the vehicle. In the controller ECU, automatic braking control is executed based on the required deceleration Gr.

A braking operation amount Ba, a braking operation signal St, a wheel speed Vw, a yaw rate Yr, a steering angle Sa, a longitudinal acceleration Gx, a lateral acceleration Gy, and a required deceleration Gr are input to the braking controller ECU. The controller ECU (electronic control unit) controls the electric motor ML of the fluid unit HU and electromagnetic valves UP, VI, and VO based on the input signals. Specifically, based on the control algorithm, drive signals Up, Vi, and Vo for controlling the electromagnetic valves UP, VI, and VO are calculated, and a drive signal Ml for controlling the electric motor ML is calculated.

The controller ECU includes a drive circuit DR for driving the electromagnetic valves UP, VI, VO, and the electric motor ML. In the drive circuit DR, a bridge circuit is formed by switching elements (power semiconductor devices such as MOS-FET and IGBT) to drive the electric motor ML. Furthermore, in the drive circuit DR, switching elements are provided so as to drive the electromagnetic valves UP, VI, and VO, and their energized states (i.e., excited states) are controlled. The drive circuit DR is provided with an energization amount sensor (current sensor) that detects the actual energization amount (supply current) of the electric motor ML and the electromagnetic valves UP, VI, and VO.

Fluid Unit HU

A known fluid unit HU is provided between the master cylinder CM and the wheel cylinder CW. The fluid unit (actuator) HU includes an electric pump DL, a low-pressure reservoir RL, a pressure adjusting valve UP, a master cylinder fluid pressure sensor PM, an inlet valve VI, and an outlet valve VO.

The electric pump DL includes one electric motor ML and two fluid pumps QL1 and QL2. When the fluid pumps QL1 and QL2 are rotated by the electric motor ML, the brake fluid BF is pumped from suction portions Bs1 and Bs2 (upstream side of the pressure adjusting valve UP). The pumped brake fluid BF is discharged to discharge portions Bt1 and Bt2 (downstream side of the pressure adjusting valve UP). The low-pressure reservoirs RL1, RL2 are provided on the suction sides of the fluid pumps QL1, QL2.

The pressure adjusting valves UP1 and UP2 are provided in the master cylinder fluid passages HM1 and HM2. A linear type electromagnetic valve (also referred to as "differential pressure valve") is adopted as the pressure adjusting valve UP where a valve opening amount (lift amount) is continuously controlled based on the energized state (e.g., supply current). A normally-open electromagnetic valve is employed as the pressure adjusting valve UP1, UP2. A target energization amount of the pressure adjusting valve UP is determined based on the calculation results (e.g., target fluid pressure of the wheel cylinder CW) of the vehicle stabilization control, the automatic braking control, and the like. The drive signal Up is determined based on the target energization amount, the energization amount (current) to the pressure adjusting valve UP is adjusted, and the valve opening amount is adjusted.

When the fluid pump QL is driven, a reflux of the brake fluid BF is generated. When energization to the pressure adjusting valve UP is not carried out and the normally-open pressure adjusting valve UP is in a fully opened state, the fluid pressure (master cylinder fluid pressure Pm) on the upstream side of the pressure adjusting valve UP and the fluid pressure on the downstream side of the pressure adjusting valve UP substantially match. When the energization amount to the normally-open pressure adjusting valve UP is increased and the valve opening amount of the pressure adjusting valve UP is decreased, the reflux of the brake fluid BF is reduced, and the downstream fluid pressure is increased by the orifice effect from the upstream fluid pressure Pm. As the electric pump DL and the pressure adjusting valve UP are controlled, the brake fluid pressure Pw is increased from the master cylinder fluid pressure Pm corresponding to the operation of the braking operation member BP. The master cylinder fluid pressure sensors PM1, PM2 are provided on the upstream side of the pressure adjusting valve UP so as to detect the master cylinder fluid pressures Pm1, Pm2. Since "Pm1=Pm2", one of the master cylinder fluid pressure sensors PM1 and PM2 can be omitted.

Specifically, the master cylinder fluid passages HM1, HM2 are branched into wheel cylinder fluid passages HWi to HWl at branch parts Bw1, Bw2. An inlet valve VI and an outlet valve VO are provided in the wheel cylinder fluid passage HW. A normally-open ON/OFF electromagnetic valve is adopted as the inlet valve VI, and a normally-closed ON/OFF electromagnetic valve is adopted as the outlet valve VO. The electromagnetic valves VI and VO are controlled by the controller ECU based on the drive signals Vi and Vo. The brake fluid pressure Pw of each wheel can be independently controlled by the inlet valve VI and the outlet valve VO.

In the inlet valve VI and the outlet valve VO, the configuration related to each wheel WH is the same. A normally-open inlet valve VI is provided in the wheel cylinder fluid passage HW (fluid passage connecting the part Bw and the wheel cylinder CW). The wheel cylinder fluid passage HW is connected to the low-pressure reservoir RL through a normally-closed outlet valve VO at a downstream of the inlet valve VI.

For example, in the antiskid control, in order to decrease the fluid pressure (brake fluid pressure) Pw in the wheel cylinder CW, the inlet valve VI is set to the closed position and the outlet valve VO is set to the open position. The inflow of the brake fluid BF from the inlet valve VI is inhibited, the brake fluid BF in the wheel cylinder CW flows out to the low-pressure reservoir RL, and the brake fluid pressure Pw is decreased. Furthermore, in order to increase the brake fluid pressure Pw, the inlet valve VI is set to the open position and the outlet valve VO is set to the close position. The outflow of the brake fluid BF to the low-pressure reservoir RL is inhibited, the downstream fluid pressure adjusted by the pressure adjusting valve UP is introduced into the wheel cylinder CW, and the brake fluid pressure Pw is increased.

The braking torque Tq of the wheel WH is increased/decreased (adjusted) by increasing/decreasing the brake fluid pressure Pw. When the brake fluid pressure Pw is increased, the force with which the friction material is pressed against the rotating member KT is increased, and the braking torque Tq is increased. As a result, the braking force of the wheel WH is increased. On the other hand, when the brake fluid pressure Pw is decreased, the pressing force of the friction material with respect to the rotating member KT is decreased, and the braking torque Tq is decreased. As a result, the braking force of the wheel WH is decreased.

Calculation Processing in Controller ECU

Figure 2:
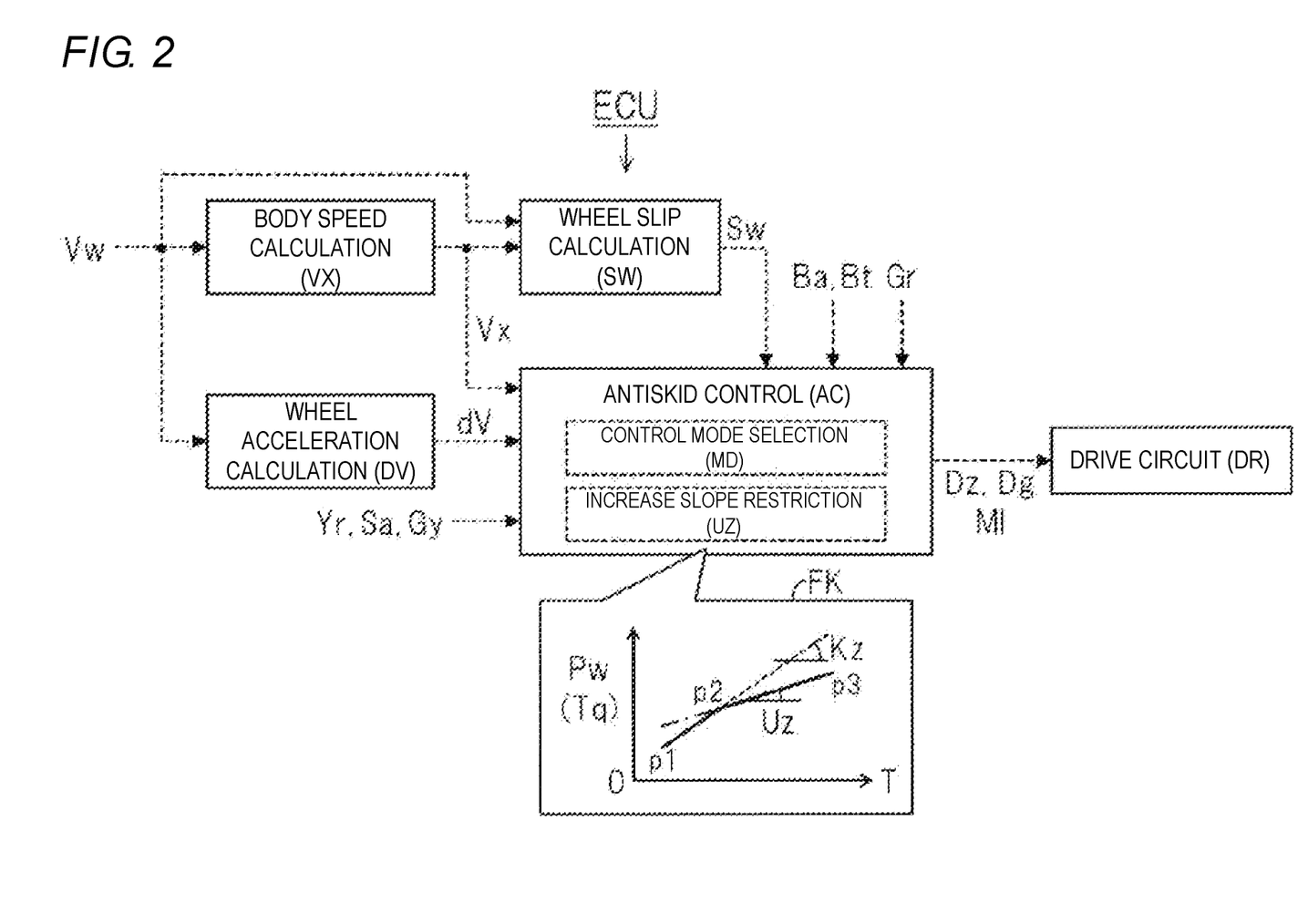
FIG. 2 is a function block diagram for explaining a calculation process in a controller ECU.

The calculation in the controller ECU will be described with reference to the function block diagram of FIG. 2. A wheel speed Vw, a yaw rate Yr, a steering angle Sa, a lateral acceleration Gy, a braking operation amount Ba, a braking operation signal St, and a required deceleration Gr are input to the controller ECU. The braking controller ECU includes a body speed calculation block VX, a wheel acceleration calculation block DV, a wheel slip calculation block SW, an antiskid control block AC, and a drive circuit DR.

In the body speed calculation block VX, the body speed Vx is calculated based on the wheel speed Vw. For example, at the time of non-braking including acceleration of the vehicle, the body speed Vx is calculated based on the slowest (slowest wheel speed) of the four wheel speeds Vw. At the time of braking, the body speed Vx is calculated based on the fastest (fastest wheel speed) of the four wheel speeds Vw. Furthermore, in the calculation of the body speed Vx, a limit may be imposed on the time change amount. That is, an upper limit value αup of the increase slope and a lower limit value αdn of the decrease slope of the body speed Vx are set, and the change in the body speed Vx is restricted by the upper and lower limit values αup, αdn.

In the wheel acceleration calculation block DV, a wheel acceleration dV (time change amount of the wheel speed Vw) is calculated based on the wheel speed Vw. Specifically, the wheel speed Vw is time differentiated to calculate the wheel acceleration dV.

In the wheel slip calculation block SW, a deceleration slip (also referred to as "wheel slip") Sw of the wheel WH is calculated based on the body speed Vx and the wheel speed Vw. The wheel slip Sw is a state quantity representing the degree of grip of the wheel WH with respect to the traveling road surface. For example, a deceleration slip speed (deviation between the body speed Vx and the wheel speed Vw) hV of the wheel WH is calculated as the wheel slip Sw (hV=Vx−Vw). Furthermore, a wheel slip ratio (=hV/Vx) in which the slip speed (speed deviation) hV is made dimensionless with the body speed Vx may be adopted as the wheel slip Sw.

In the antiskid control block AC, the antiskid control is executed based on the wheel acceleration dV, the wheel slip Sw, the braking operation amount Ba, the operation signal St, the required deceleration Gr, the body speed Vx, the yaw rate Yr, the steering angle Sa, and the lateral acceleration Gy. Specifically, first, "whether or not braking is in progress" is determined based on at least one of the braking operation amount Ba, the operation signal St, and the required deceleration Gr. When at least one condition of "the braking operation amount Ba is greater than or equal to a predetermined value bo", "the operation signal St is in the ON state", and "the required deceleration Gr is greater than or equal to a predetermined value go" is satisfied, and affirmative determination is made for "braking is in progress", start of execution of the antiskid control is permitted in each wheel WH.

In the antiskid control block AC, "whether or not the vehicle is turning sharply" is determined. For example, the determination on the sharp turn of the vehicle is performed based on the actual lateral acceleration Gy. When the lateral acceleration Gy is greater than or equal to a predetermined value gy, the turning state of the vehicle is determined to be a sharp turning state. On the other hand, when the lateral acceleration Gy is smaller than the predetermined value gy, the sharp turning state of the vehicle is not determined. Here, the predetermined value gy is a preset constant. When the body speed Vx is considered, the lateral acceleration can be calculated based on the yaw rate Yr or the steering angle Sa. Therefore, the determination on the sharp turn of the vehicle is determined based on at least one of the lateral acceleration Gy, the yaw rate Yr, and the steering angle Sa. In this case as well, similarly to the above, the presence/absence of the sharp turning state of the vehicle is determined based on the comparison with the predetermined value gy.

The turning direction of the vehicle is identified along with the determination of a sharp turn. The turning direction is identified based on at least one of the lateral acceleration Gy, the yaw rate Yr, and the steering angle Sa. Furthermore, based on the turning direction, the outer wheel and the inner wheel are identified in the turning, and the outside turning front wheel is specified. Specifically, the outside turning front wheel is determined to be the right front wheel WHi when turning left and the left front wheel WHj when turning right.

Execution of the antiskid control in each wheel WH (i.e., adjustment of fluid pressure Pw of each wheel cylinder CW) is performed by selecting one of the decreasing mode (pressure decreasing mode) Mg and the increasing mode (pressure increasing mode) Mz. Here, the decreasing mode Mg and the increasing mode Mz are generically called "control modes" and are determined by a control mode selecting block MD included in the antiskid control block AC. Specifically, in the control mode selecting block MD, a plurality of threshold values are set in advance so as to determine each control mode of the antiskid control. Either one of the decreasing mode Mg or the increasing mode Mz is selected based on the mutual relationship between these threshold values and "the wheel acceleration dV and the wheel slip Sw". In addition, in the control mode selecting block MD, the decrease slope Kg in the decreasing mode Mg (time change amount at the time of decrease of the brake fluid pressure Pw) and the increase slope Kz in the increasing mode Mz (time change amount at the time of increase of the brake fluid pressure Pw) is determined based on the mutual relationship. Then, the duty ratio Dg of the outlet valve VO is calculated based on the decrease slope Kg. Furthermore, the duty ratio Dz of the inlet valve VI is determined based on the increase slope Kz. Here, the "duty ratio" is a ratio of the energization time (ON time) per unit time.

The antiskid control block AC includes an increase slope restricting block UZ. When the antiskid control is executed at the time of a sharp turn of the vehicle by the increase slope restricting block UZ, the increase slope Kz of the outside turning front wheel is restricted. In the increase slope restricting block UZ, the turning direction of the vehicle is determined based on at least one of the yaw rate Yr, the lateral acceleration Gy, and the steering angle Sa. The outside turning front wheel is thereby identified. Furthermore, in the increase slope restricting block UZ, the understeer index Du is calculated based on the actual yaw rate Yr and the steering angle Sa. Here, the understeer index Du is a state quantity representing the degree (magnitude) of the understeer of the vehicle. Then, based on the understeer index Du, the limit value Uz is calculated, and the increase slope Kz of the outside turning front wheel is restricted to the limit value Uz. A detailed calculation method of the understeer index Du and the limit value Uz will be described later.

The relationship between the increase slope Kz and the limit value Uz will be described with reference to the time-series diagram of a blowing unit FK. The time-series diagram shows a change in the brake fluid pressure Pw (i.e., braking torque Tq) with respect to time T. The non-restricted (i.e., before restriction) increase slope Kz indicated by the broken line is a change amount of the brake fluid pressure Pw with respect to time T. When the antiskid control is executed on one of the left and right front wheels and antiskid control is not executed on the other front wheel, the increase slope Kz before the restriction of the other front wheel (i.e., the outside turning front wheel) is determined according to the operation (particularly, operation speed) of the braking operation member BP. Furthermore, in the braking by the automatic braking control, the increase slope Kz before the restriction is determined by the time change amount of the required deceleration Gr. When the antiskid control is executed on the left and right front wheels, the increase slope Kz before the restriction is instructed by the controller ECU by at least one of the wheel acceleration dV and the wheel slip Sw.

The increase slope Kz is restricted by a limit value Uz (target value) indicated by a dashed line. If the increase slope Kz does not exceed the limit value Uz, the increase slope Kz is left as it is (line segment p1-p2). On the other hand, if the increase slope Kz exceeds the limit value Uz, the increase slope Kz (target value) is determined to be the limit value Uz (line segment p2-p3). As a result, as shown by the solid line, the actual increase slope Kz is decreased from the increase slope Kz before restriction (broken line) and instructed (line segment p1-p2-p3). When the target increase slope Kz is decreased, the duty ratio Dz of the normally-open inlet valve VI is increased. The time of the closed position of the inlet valve VI is lengthened (i.e., the inlet valve VI is driven more toward the closing side), and the actual increase slope Kz is decreased. In other words, in the outside turning front wheel, restriction is given by the limit value Uz with respect to the increase slope Kz (value corresponding to at least one of braking operation amount Ba, required deceleration Gr, wheel acceleration dV, and wheel slip Sw, increase slope Kz before the restriction) in a case where the antiskid control is executed when the vehicle is not turned sharply, and the increase slope Kz is adjusted to decrease from the increase slope Kz before the restriction.

When the decreasing mode Mg is selected and the brake fluid pressure Pw is decreased by the antiskid control, the inlet valve VI is closed and the outlet valve VO is opened. That is, the pressure increasing duty ratio Dz is determined to be "100% (always energized)", and the outlet valve VO is driven based on the pressure decreasing duty ratio Dg. The brake fluid BF in the wheel cylinder CW is moved to the low-pressure reservoir RL, and the brake fluid pressure Pw is decreased. Here, the pressure decreasing speed (time slope in decreasing the brake fluid pressure Pw, decrease slope) is determined by the duty ratio Dg of the outlet valve VO. "100%" of the pressure decreasing duty ratio Dg corresponds to the normally-open state of the outlet valve VO, and the brake fluid pressure Pw is rapidly decreased. The closed position of the outlet valve VO is achieved by "Dg=0% (non-energization)".

When the increasing mode Mz is selected and the brake fluid pressure Pw is increased by the antiskid control, the inlet valve VI is opened and the outlet valve VO is closed. That is, the pressure decreasing duty ratio Dg is determined to be "0%", and the inlet valve VI is driven based on the pressure increasing duty ratio Dz. The brake fluid BF is moved from the master cylinder CM to the wheel cylinder CW, and the brake fluid pressure Pw is increased. The pressure increasing speed (time slope in increasing the brake fluid pressure, increase slope Kz) is adjusted by the duty ratio Dz of the inlet valve VI. "0%" of the pressure increasing duty ratio Dz corresponds to the normally-open state of the inlet valve VI, and the brake fluid pressure Pw is rapidly increased. The closed position of the inlet valve VI is achieved by "Dz=100% (always energized)".

When the brake fluid pressure Pw needs to be maintained by the antiskid control, the outlet valve VO or the inlet valve VI is always closed in the decreasing mode Mg or the increasing mode Mz. Specifically, in the decreasing mode Mg, when it is necessary to maintain the brake fluid pressure Pw, the duty ratio Dg of the outlet valve VO is determined to be "0% (normally-closed state)". Furthermore, in the increasing mode Mz, when it is necessary to maintain the brake fluid pressure Pw, the duty ratio Dz of the inlet valve VI is determined to be "100% (normally-closed state)".

In the drive circuit DR, the electromagnetic valves VI, VO and the electric motor ML are driven based on the pressure increasing/decreasing duty ratios Dz, Dg and the drive signal Ml. In the drive circuit DR, a drive signal Vi for the inlet valve VI is calculated based on the pressure increasing duty ratio Dz, and a drive signal Vo for the outlet valve VO is determined based on the pressure decreasing duty ratio Dg so as to execute the antiskid control. Furthermore, the drive signal Ml is calculated so as to drive the electric motor ML at a predetermined rotation number set in advance. The brake fluid BF is returned from the low-pressure reservoir RL to the upstream part Bt of the inlet valve VI by the drive of the electric motor ML.

Calculation Process in Increase Slope Restricting Block UZ

Figure 3:
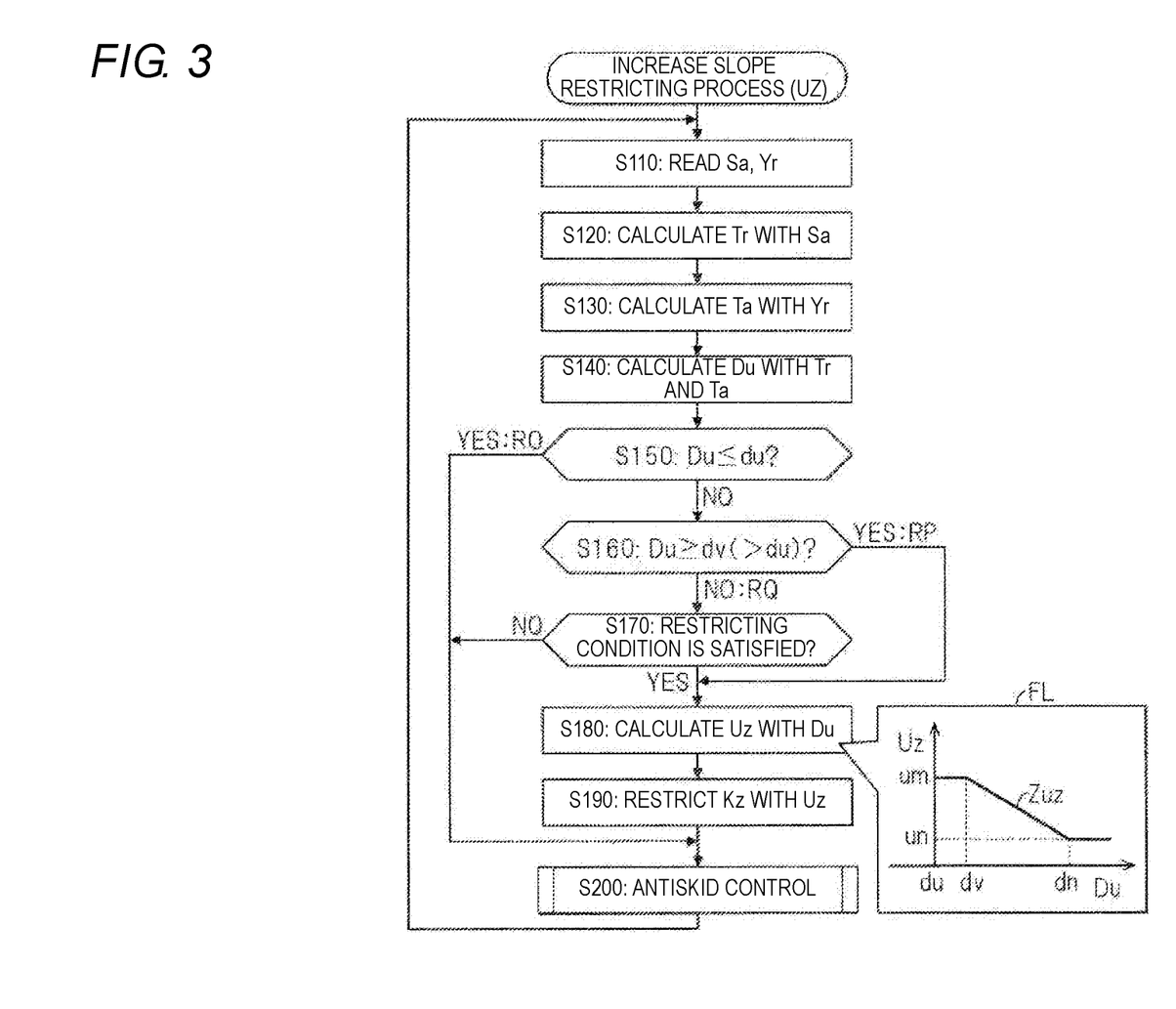
FIG. 3 is a control flowchart for explaining a calculation process in an increase slope restricting block UZ.

With reference to the control flowchart of FIG. 3, a calculation process in the increase slope restricting block UZ will be described. This process is executed on the assumption that the antiskid control started on at least one of the left and right front wheels when the vehicle is turned sharply. In the increase slope restricting block UZ, a limit value Uz is calculated so as to restrict and adjust to decrease the increase slope Kz of the front wheel on the outer side in the turning direction.

Turning Direction

First, the direction of each state quantity (yaw rate Yr, steering angle Sa, lateral acceleration Gy, etc.) will be described. The turning direction of the vehicle includes a left direction and a right direction. In order to distinguish the turning direction, the straight traveling state of the vehicle is set to "0 (neutral position)", and the sign of each state quantity represents the turning direction. In the following description, "left turning direction" is represented by "positive sign (+)", and "right turning direction" is represented by "negative sign (−)".

In step S110, the steering angle Sa and the yaw rate Yr are read. The steering angle Sa (e.g., operation angle of the steering wheel WS), which is a steering angle of the steered wheels (front wheels) WHi and WHj is detected by the steering angle sensor SA. The yaw rate Yr, which is the rotation angular speed of the vehicle about a vertical axis, is detected by the yaw rate sensor YR. In step S120, a reference turning amount Tr is calculated based on the steering angle Sa. The reference turning amount Tr is a state quantity indicating the vehicle traveling direction intended by the driver. In other words, the reference turning amount Tr is a state variable that represents the traveling direction of the vehicle when all wheels WH have a slight slip and are in a grip state. In step S130, the actual turning amount Ta is calculated based on the actual yaw rate Yr. The actual turning amount Ta is a state quantity representing the actual traveling direction of the vehicle as a result of the driver's steering operation and the antiskid control (i.e., the difference between the left and right braking forces). Here, the reference turning amount Tr and the actual turning amount Ta are calculated as the same physical quantity.

For example, the reference turning amount Tr and the actual turning amount Ta are calculated as the same physical quantity in the dimension of the yaw rate. In this case, the reference turning amount Tr (reference yaw rate) is determined based on a predetermined relationship in consideration of the steering angle Sa, the body speed Vx, and the stability factor. At this time, the actual yaw rate Yr is determined as is as the actual turning amount Ta (Ta=Yr). Alternatively, the reference turning amount Tr and the actual turning amount Ta are calculated in the dimension of the steering angle. In this case, the steering angle Sa is determined as is as the reference turning amount Tr (Tr=Sa). Then, the actual turning amount Ta is calculated based on the yaw rate Yr, the body speed Vx, and a predetermined relationship. In any case, the reference turning amount Tr is calculated based on the steering angle Sa, and the actual turning amount Ta is calculated based on the yaw rate Yr.

In step S140, the understeer index Du is calculated based on the deviation hT between the reference turning amount Tr and the actual turning amount Ta and the direction sgn Ta of the actual turning amount Ta. The understeer index Du is a state quantity representing the degree of understeer of the vehicle. In other words, the understeer index Du is a state variable expressing the magnitude of the influence of the left-right difference of the front wheel braking force due to the antiskid control at the time of the sharp turn. Specifically, the understeer index Du is calculated by the following equation (1).

$$Du = \operatorname{sgn} Ta \cdot (Tr - Ta) = \operatorname{sgn} Ta \cdot hT \qquad \text{Equation (1)}$$

Here, sgn is a sign function (also referred to as a "signum function"), and is a function that returns any of "plus 1", "minus 1", and "0" according to the sign of the argument. Since the actual turning amount Ta is calculated based on the actual yaw rate Yr, the direction sgn Ta of the actual turning amount Ta matches the direction sgnYr of the actual yaw rate Yr.

In step S150, "whether or not the understeer index Du is smaller than or equal to a first threshold value du" is determined. Here, the first threshold value du is a constant for determination set in advance. For example, the first threshold value du is determined as "0". Alternatively, the first threshold value du can be set as a range having a predetermined width. If "Du≤du: YES", the process proceeds to step S200, and normal antiskid control is executed. A case where the Du is smaller than or equal to the first threshold value du is referred to as a "non-adjustment region RO". When the understeer index Du is in the non-adjustment region RO, steps S160 to S190 are bypassed, and the increase slope Kz is not adjusted (restricted). Therefore, the pressure increasing duty ratio Dz of the outside turning front wheel is determined by "the increase slope Kz before adjustment corresponding to at least one of the braking operation amount Ba and the required deceleration Gr" or "the increase slope Kz before adjustment calculated based on at least one of the wheel acceleration dV and the wheel slip Sw". That is, the pressure increasing duty ratio Dz, which is equivalent to the case where the sharp turning state of the vehicle is not determined, is calculated.

On the other hand, if "Du>du: NO" and negative determination is made in step S150, the process proceeds to step S160. In step S160, "whether or not the understeer index Du is greater than or equal to a second threshold value dv" is determined. Here, the second threshold value dv is a constant for determination set in advance, and is a value greater than the first threshold value du. A case where the understeer index Du is greater than or equal to the second threshold value dv is referred to as an "adjustment region RP". When affirmative determination is made in step S160, the understeer index Du is in the adjustment region RP, and the process proceeds to step S180.

A case where the understeer index Du is greater than the first threshold value du and smaller than the second threshold value dv is referred to as "transition region RQ". When negative determination is made in step S160, the understeer index Du is in the transition region RQ, and the process proceeds to step S170. In step S170, "whether or not the restricting condition is satisfied" is determined. Here, the restricting condition is for determining whether or not restriction (decrease adjustment) is necessary in the transition region RQ. Details of the restricting condition will be described later. In the transition region RQ, the increase slope Kz is decreased when the restricting condition is satisfied, but the increase slope Kz is not decreased when the restricting condition is not satisfied. Therefore, when negative determination is made in step S170, the process proceeds to step S200, and the (normal) antiskid control equivalent to the case where the sharp turn is not determined is executed (that is, the increase slope Kz is not decreased). On the other hand, when affirmative determination is made in step S170, the process proceeds to step S180. In step S180, a limit value Uz is calculated based on the understeer index Du.

The calculation of the limit value Uz will be described with reference to the blowing unit FL of step S180. The limit value Uz is calculated based on the understeer index Du and a preset calculation map Zuz. When the understeer index Du is smaller than or equal to the first threshold value du, the region is the non-adjustment region RO, and the limit value Uz is not calculated. Therefore, in "Du≤du", the increase slope Kz is not restricted. When the understeer index Du is greater than the first threshold value du and smaller than the second threshold value dv, the region is the transition region RQ, and the limit value Uz is calculated to a predetermined value um. When the understeer index Du is greater than or equal to the second threshold value dv, the region is the adjustment region RP, and the limit value Uz is calculated to decrease from the predetermined value um as the understeer index Du increases. The limit value Uz has a predetermined lower limit value un. Therefore, in "Du≥dn", "Uz=um" is determined. Here, the predetermined values du, dv, and dn are constants set in advance, and have a relation of "du<dv<dn". Similarly, the predetermined values um and un are constants set in advance, and have a relationship of "um>un". The limit value Uz is calculated based on the understeer index Du so as to become smaller (the restriction becomes stricter) as the degree of understeer becomes stronger (particularly, the adjustment region RP greater than or equal to the second threshold value dv). Thus, the understeer behavior of the vehicle caused by the difference between the left and right braking forces of the front wheels is reliably suppressed.

In step S190, the increase slope Kz is restricted based on the limit value Uz, and the pressure increasing duty ratio Dz of the outside turning front wheel is determined. In step S200, antiskid control is executed based on the pressure increasing duty ratio Dz. Since the necessity of the decrease adjustment of the increase slope Kz is appropriately determined based on the understeer index Du, the trade-off relationship described above (i.e., the suppression of the understeer behavior and the securing of the vehicle deceleration) is suitably compatible.

Restricting Condition in Transition Region RQ

Figure 4:
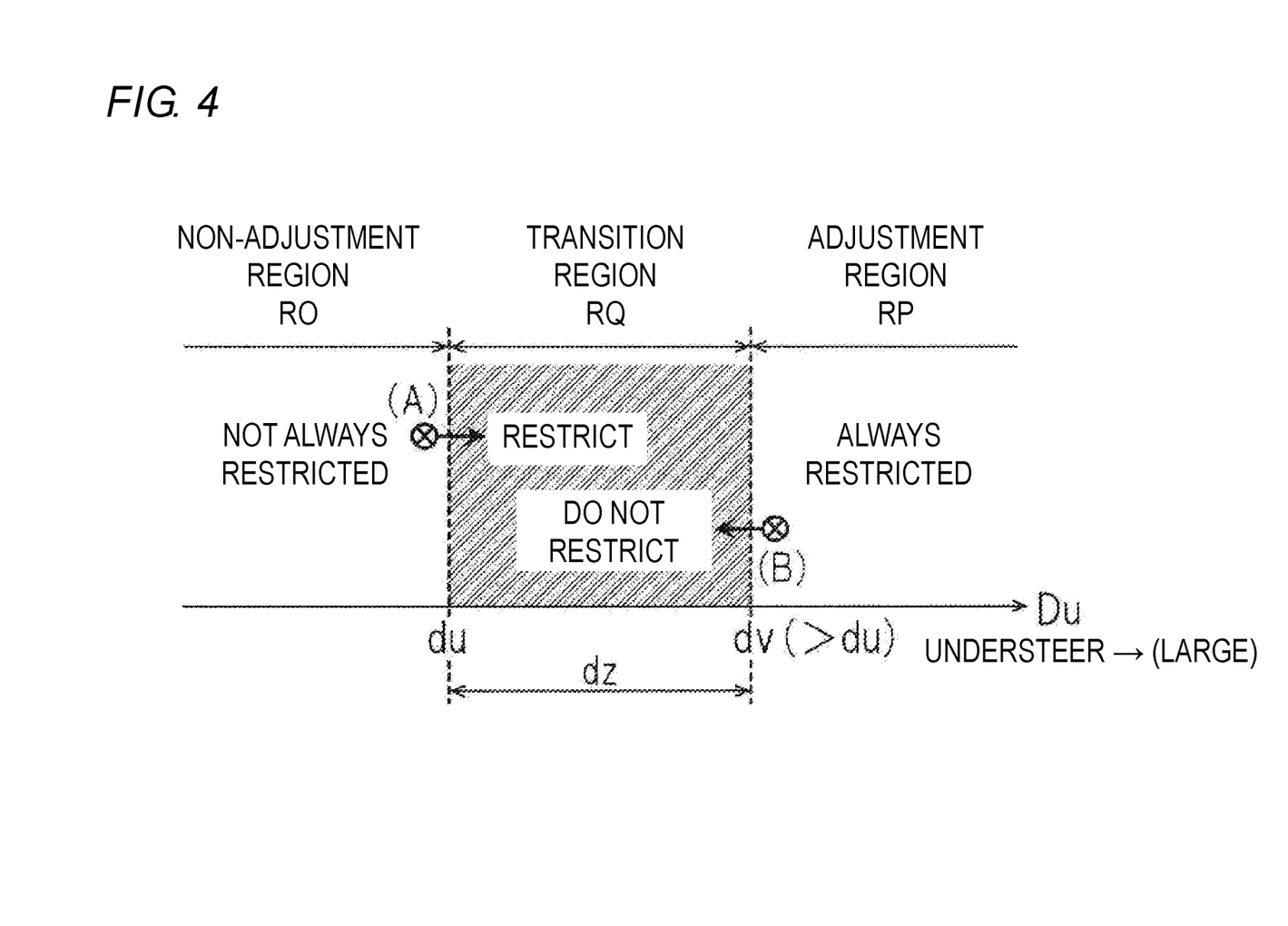
FIG. 4 is a schematic view for explaining a restricting condition in step S170.

The restricting condition of step S170 will be described with reference to the schematic view of FIG. 4. "Du≤du" is the non-adjustment region RO, and "Du≥dv" is the adjustment region RP. In the non-adjustment region RO, the increase slope Kz is not always restricted (decreased). On the other hand, in the adjustment region RP, the increase slope Kz is always restricted and adjusted to decrease.

The transition region RQ is set between the adjustment region RP and the non-adjustment region RO. The transition region RQ is "a region where the understeer index Du is greater than the first threshold value du but smaller than the second threshold value dv". Note that the second threshold value dv is greater than the first threshold value du by a predetermined value dz. In other words, the first threshold value du and the second threshold value dv are separated by a predetermined value dz. In the transition region RQ, the following condition 1 is set as a condition (restricting condition) for restricting the increase slope Kz.

Condition 1: "Whether or not the understeer index Du transitioned from the non-adjustment region RO to the transition region RQ"

The affirmative determination is made in condition 1 in a case (see transition indicated by (A)) where the understeer index Du changed from a state of smaller than the first threshold value du (i.e., inside the non-adjustment region RO) to a state of greater than or equal to the first threshold value du (i.e., inside the transition region RQ). When the affirmative determination is made in condition 1, the increase slope Kz is immediately restricted. On the other hand, negative determination is made in condition 1 and the increase slope Kz is not restricted in a case (see transition indicated by (B)) where the understeer index Du changed from a state of greater than or equal to the second threshold value dv (i.e., inside the adjustment region RP) to a state of smaller than the second threshold value dv (i.e., inside the transition region RQ). That is, in the transition region RQ (in the case of "du<Du<dv"), the increase slope Kz decreases when the understeer index Du is transitioned from the non-adjustment region RO, but the increase slope Kz does not decrease when the understeer index Du is transitioned from the adjustment region RP.

In the transition of "RO→RQ", a state where the understeer state gradually increases and the deviation (turning amount deviation) hT between the reference turning amount Tr and the actual turning amount Ta is increasing is obtained, and hence the increase slope Kz is rapidly decreased. On the other hand, in the transition of "RP→RQ", the understeer state gradually converges, and the turning amount deviation hT is decreasing. Thus, the increase slope Kz is increased early, and the deceleration of the vehicle is ensured. Both directional stability and deceleration ability of the vehicle are compatible by providing the transition region RQ having the restricting conditions described above between the adjustment region RP and the non-adjustment region RO.

In the restricting condition, the following condition 2 is added to the above condition 1.

Condition 2: "Whether or not the time (duration) Tv from the time point the understeer index Du transitioned from the non-adjustment region RO to the transition region RQ is calculated, the understeer index Du is inside the transition region RQ, and the duration Tv exceeds a predetermined time tv".

Here, the predetermined time tv is a preset constant.

The calculation of the understeer index Du includes the influence of noise and the like. In order to improve the reliability of the determination, the timer is operated from the time point the affirmative determination is made for the condition 1, and the duration Tv from the relevant time point is calculated. Then, at a time point the understeer index Du is inside the transition region RQ and the duration Tv exceeds the predetermined time tv, the restriction of the increase slope Kz is started. That is, when the increase slope Kz is not immediately restricted at a time point the condition 1 is satisfied but the state is continued over a predetermined time tv, the increase slope Kz is restricted. With the provision of the condition of the duration Tv, the determination accuracy is improved, and the repetition (complication of control) of "restriction/non-restriction" that occurs when the understeer index Du is increased/decreased near the first threshold value du can be avoided.

The restricting conditions for a case where the transition of "RO→RQ" has occurred under condition 1 or condition 1+2 has been described. Apart therefrom, the following condition 3 is provided as a restricting condition for a case where the transition of "RP→RQ" has occurred.

Condition 3: "Whether or not the time (duration) Tu from the time point the understeer index Du transitioned from the adjustment region RP to the transition region RQ is calculated, the understeer index Du is inside the transition region RQ, and the duration Tu exceeds a predetermined time tu".

Here, the predetermined time tu is a preset constant.

According to condition 3, a time guard is provided in adjusting the increase slope Kz in the transition region RQ. As described above, in the transition region RQ, the increase slope Kz is not decreased when the understeer index Du transitions from the adjustment region RP. However, when the understeer index Du is still within the transition region RQ even after elapse of a predetermined time tu although the deviation hT between the reference turning amount Tr and the actual turning amount Ta is decreasing, the adjustment to decrease the increase slope Kz is started again. Thus, the understeer behavior is reliably suppressed, and the directional stability of the vehicle can be maintained.

The processes under the restricting condition will be summarized. In step S170, the adjustment to decrease the increase slope Kz is started in a calculation cycle in which an affirmative determination is made in either one of "the understeer index Du transitioned from the non-adjustment region RO to the transition region RQ (condition 1)", and "the understeer index Du has transitioned from the adjustment region RP to the transition region RQ, the understeer index Du is inside the transition region RQ, and the duration Tu exceeds the predetermined time tu (condition 3)". Alternatively, the adjustment to decrease the increase slope Kz is started in a calculation cycle in which an affirmative determination is made in one of "the understeer index Du transitioned from the non-adjustment region RO to the transition region RQ, the understeer index Du is inside the transition region RQ, and the duration Tv exceeds the predetermined time tv (condition 1+2)" and condition 3.

Operation/Effect

The operations/effects of the present invention will be described with reference to the time-series diagram of FIG. 5 (change diagram of the understeer index Du with respect to time T).

The braking control device SC according to the present invention includes an actuator HU that individually adjusts the braking torque Tq of the wheels WH of the vehicle, and a controller ECU that executes an antiskid control for decreasing the increase slope Kz of the braking torque Tq of the outside turning front wheel of the vehicle through the actuator HU when a sharp turn of the vehicle is determined. Furthermore, the braking control device SC includes a steering angle sensor SA that detects a steering angle Sa of the front wheels WHi and WHj, which are steered wheels of the vehicle, and a yaw rate sensor YR that detects a yaw rate Yr of the vehicle. For example, a sharp turn of the vehicle is determined when at least one of the lateral acceleration Gy, the yaw rate Yr, and the steering angle Sa is greater than or equal to a predetermined value set in advance. Therefore, the sharp turn of the vehicle is not determined when the state quantity is smaller than the predetermined value. In this determination, a front wheel located on the outer side of turning and a front wheel located on the inner side of turning are distinguished.

In the controller ECU, the reference turning amount Tr is calculated based on the steering angle Sa, and the actual turning amount Ta is calculated based on the yaw rate Yr. Here, the reference turning amount Tr and the actual turning amount Ta have the same physical quantity (e.g., the dimension of the yaw rate or the steering angle). The understeer index Du is calculated based on a deviation hT between the reference turning amount Tr and the actual turning amount Ta. The understeer index Du (state variable) represents the degree of yaw rate behavior of the vehicle. Specifically, the greater the understeer index Du, the smaller the actual yaw rate Yr with respect to the reference yaw rate Yt corresponding to the steering angle Sa, and the greater the degree of deflection (i.e., understeer) of the vehicle in the outside turning direction. Then, three regions RO, RP, and RQ are set according to the understeer index Du. Note that the direction sgn Ta of the actual turning amount Ta can be considered in the calculation of the understeer index Du.

(1) When the understeer index Du is smaller than or equal to the first threshold value du, it is set to the non-adjustment region RO. In the non-adjustment region RO, the increase slope Kz is not always decreased.

(2) When the understeer index Du is greater than or equal to the second threshold value dv, it is set to the adjustment region RP. The second threshold value dv is greater than the first threshold value du by a predetermined value dz. In the adjustment region RP, the increase slope Kz is always decreased.

(3) When the understeer index Du is greater than the first threshold value du and smaller than the second threshold value dv, the transition region RQ is set. In the transition region RQ, the necessity of decrease in the increase slope Kz is determined based on the changing direction of the understeer index Du. The increase slope Kz is decreased when the understeer index Du transitioned from the non-adjustment region RO to the transition region RQ. On the other hand, the increase slope Kz is not decreased (see "condition 1 of restricting condition") when the understeer index Du transitioned from the adjustment region RP to the transition region RQ.

Figure 5:
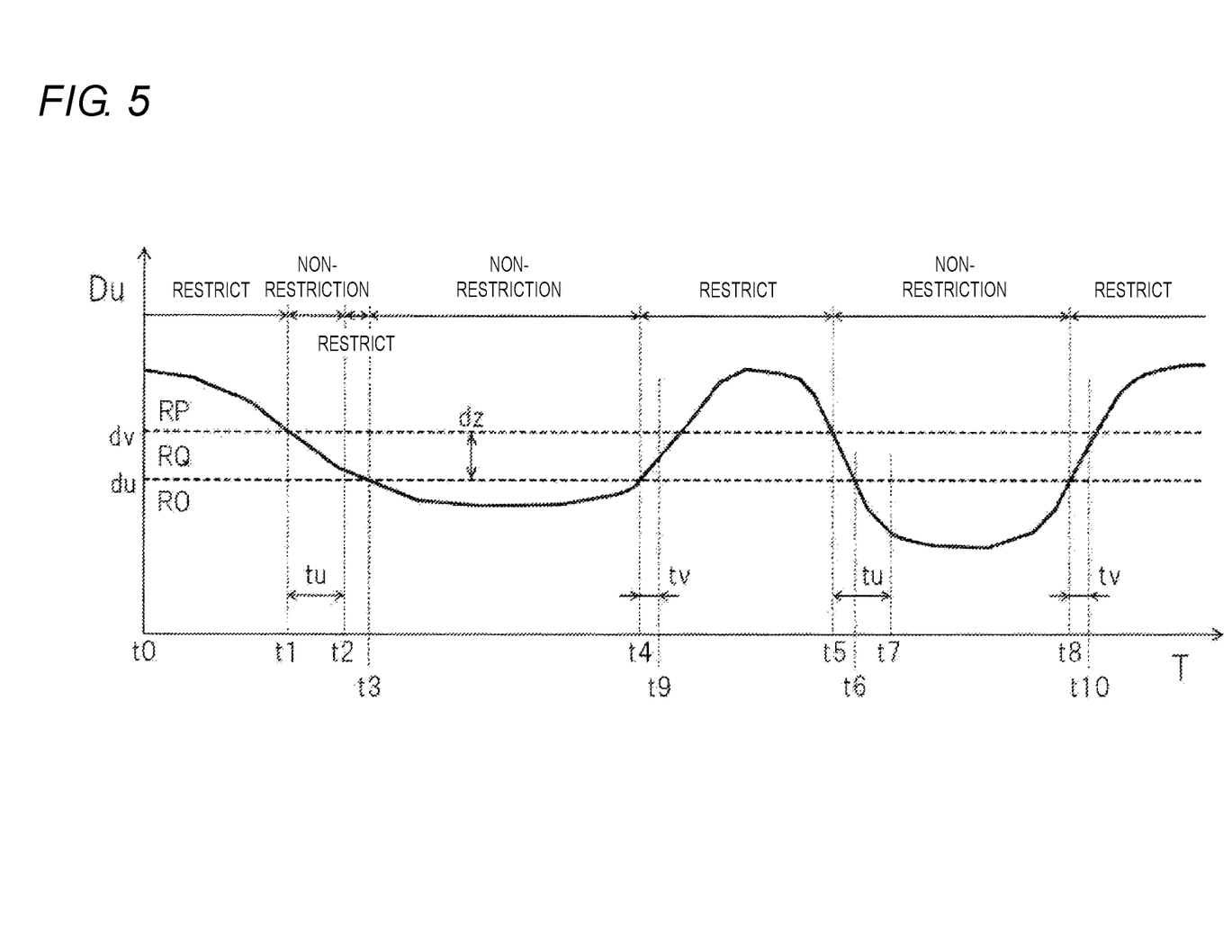
FIG. 5 is a time-series diagram for explaining operations and effects.

As shown in the time-series diagram of FIG. 5, when the understeer index Du changes, the lower part of the broken line indicated by the first threshold value du is the non-adjustment region RO, and the upper part of the broken line indicated by the second threshold value dv is the adjustment region RP. The first threshold value du and the second threshold value dv are separated by a predetermined value dz in the understeer index Du, and the transition region RQ is between two broken lines.

From the time point t0 to the time point t1, "Du≥du" is satisfied, and thus the increase slope Kz is restricted (decreased). Specifically, according to limit value Uz calculated based on understeer index Du, the increase slope Kz is decreased from the increase slope Kz corresponding to a case where a sharp turn is not determined. The degree of decrease in the increase slope Kz becomes greater as the understeer index Du increases. That is, as the understeer index Du increases, the increase slope Kz further decreases (however, decreases to the lower limit value un). The understeer thus can be reliably reduced. The "increase slope Kz corresponding to a case where a sharp turn is not determined" is based on one of "increase slope Kz corresponding to the braking operation member BP", "increase slope Kz corresponding to the required deceleration Gr", and "increase slope Kz corresponding to the wheel acceleration dV, the wheel slip Sw".

At time point t1, the understeer index Du changes from the adjustment region RP to the transition region RQ. Therefore, affirmative determination is made in condition 1 of the restricting condition, and the restriction on the increase slope Kz is canceled. At time point t3, the understeer index Du transitions from the transition region RQ to the non-adjustment region RO. In the non-adjustment region RO, the increase slope Kz is not restricted. At time point t4, the understeer index Du transitions from the non-adjustment region RO to the transition region RQ. At time point t4, negative determination is made in condition 1 of the restricting condition, and the restriction on the increase slope Kz is started. Similarly, after time point t4, the increase slope Kz is not restricted from "t5 to t8", and after time point t8, the increase slope Kz is restricted again. In the transition of "RO→RQ", since the understeer tendency is expanding, the increase slope Kz is decreased, and vehicle stability is ensured. On the other hand, in the transition of "RP→RQ", since the understeer tendency is converging, the increase slope Kz is increased early, and the deceleration of the vehicle is ensured. In this way, since the necessity of restriction (decrease adjustment) is determined in view of the changing direction of the understeer index Du, the directional stability of the vehicle and the deceleration ability of the vehicle are compatible.

In the braking control device SC according to the present invention, the duration Tv from the time point the understeer index Du transitioned from the non-adjustment region RO to the transition region RQ is calculated. At a time point the duration Tv exceeds the predetermined time tv when the understeer index Du is still within the transition region RQ continuously, the decrease in the increase slope Kz is started (see "condition 2 of restricting condition").

In the time-series diagram of FIG. 5, the transition of "RO→RQ" occurs at time points t4 and t8. Therefore, the calculation of the duration Tv is started at time points t4 and t8. At time points t9 and t10, the duration Tv exceeds the predetermined time tv. Thus, the decrease in the increase slope Kz is started at time points t9 and t10. The start of restriction of the increase slope Kz can be determined more reliably by adopting the condition of the duration Tv in addition to the transition condition of "RO→RQ". In addition, the complexity of control caused by the understeer index Du slightly increasing/decreasing in the vicinity of the first threshold value du can be suppressed.

In the braking control device SC according to the present invention, the duration Tu from the time point the understeer index Du transitioned from the adjustment region RP to the transition region RQ is calculated. At a time point the duration Tu exceeds the predetermined time tu when the understeer index Du is still within the transition region RQ continuously, the decrease in the increase slope Kz is started (see "condition 3 of restricting condition").

In the time-series diagram of FIG. 5, the transition of "RP→RQ" occurs at time point t1. Therefore, at time point t1, the calculation of the duration Tu is started. Since it takes time for the understeer index Du to transition to the non-adjustment region RO, the duration Tu exceeds the predetermined time tu at time point t2. Therefore, the decrease in the increase slope Kz is started at the time point t2. Then, at time point t3, the understeer index Du transitions to the non-adjustment region RO, so that the decrease in the increase slope Kz is canceled (stopped). At time point t5, the transition of "RP→RQ" occurs again. In this case, the understeer index Du transitions to the non-adjustment region RO before the duration Tu reaches the predetermined time to (time point t6). Regardless of the restriction on the duration Tu, the increase slope Kz is not decreased. Thus, the condition for adjusting to decrease the increase slope Kz is restricted by time. If the understeer behavior is converging, but the transition of the understeer index Du to the non-adjustment region RO is taking time, the restriction (decrease) of the increase slope Kz is restarted, and the influence of the difference between the left and right braking forces is reliably reduced.

Other Embodiments

Other embodiments will be described below. Other embodiments also have the same effects as above.

In the embodiment described above, the target increase slope Kz is restricted based on the limit value Uz (target value), the pressure increasing duty ratio Dz is adjusted, and the actual increase slope Kz is decreased. Instead, the pressure increasing duty ratio Dz can be directly adjusted to increase based on the understeer index Du. That is, the limit value Uz is not calculated, and the actual increase slope Kz is decreased based on the understeer index Du.

In the embodiment described above, a diagonal fluid passage is exemplified as the two-system fluid passage. Instead, a front-back type (also referred to as "H-type") configuration may be adopted. In the front-back fluid passage, the wheel cylinders CWi and CWj for the front wheels are fluidly connected to the first master cylinder fluid passage HM1 (i.e., the first system). In addition, the wheel cylinders CWk and CWl for the rear wheels are fluidly connected to the second master cylinder fluid passage HM2 (i.e., the second system).

In the embodiments described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiments described above, the hydraulic braking control device SC using the brake fluid BF has been exemplified. Instead, an electric braking control device SC that does not use the brake fluid BF is employed. In this device, the rotation of the electric motor is converted into linear power by a screw mechanism or the like, and the friction member is pressed against the rotating member KT. In this case, the braking torque Tq is generated by the pressing force of the friction member against the rotating member KT generated by using the electric motor as a power source instead of the brake fluid pressure Pw.

The invention claimed is:

1. A braking control device of a vehicle comprising:
    an actuator that individually adjusts a braking torque of wheels of the vehicle;
    a controller that executes an antiskid control for decreasing an increase slope of a braking torque of an outside turning front wheel of the vehicle through the actuator when a sharp turn of the vehicle is determined;
    a steering angle sensor that detects a steering angle of a steered wheel of the vehicle; and
    a yaw rate sensor that detects a yaw rate of the vehicle, wherein
    the controller is configured to:
    calculate a reference turning amount based on the steering angle,
    calculate an actual turning amount based on the yaw rate,
    calculate an understeer index representing a magnitude of understeer of the vehicle based on the reference turning amount and the actual turning amount,
    set to a non-adjustment region in which the increase slope is not decreased when the understeer index is smaller than or equal to a first threshold value,
    set to an adjustment region in which the increase slope is decreased when the understeer index is greater than or equal to a second threshold value greater than the first threshold value, and
    set to a transition region in which the increase slope is decreased when the understeer index is transitioned from the non-adjustment region and the increase slope is not decreased when the understeer index is transitioned from the adjustment region when the understeer index is greater than the first threshold value and smaller than the second threshold value.

2. The braking control device of the vehicle according to claim 1, wherein the controller is configured to:
   calculate a duration from a time point the understeer index transitioned from the non-adjustment region to the transition region in the transition region, and
   when the understeer index is within the transition region, start to decrease the increase slope at a time point the duration exceeds a predetermined time.

\* \* \* \* \*